United States Patent

Frey, III

[15] 3,685,682

[45] Aug. 22, 1972

[54] HERMETIC SEALING SYSTEM

[72] Inventor: Langdon T. Frey, III, Newton, N.C.

[73] Assignee: General Electric Company

[22] Filed: Nov. 2, 1970

[21] Appl. No.: 85,886

[52] U.S. Cl. ............... 220/46 R, 156/69, 220/81 R, 220/85 TC
[51] Int. Cl. .......................................... B65d 53/00
[58] Field of Search..220/46 R, DIG. 4, 85 TC, 81 R, 220/46 MS; 277/72 FM; 285/294, 297, 53; 292/256.61; 49/475; 156/69, 242, 305

[56] References Cited

UNITED STATES PATENTS

| | | | |
|---|---|---|---|
| 2,750,069 | 6/1956 | Gross | 220/81 R |
| 1,220,262 | 3/1917 | Mueller et al. | 220/46 R |
| 1,246,470 | 11/1917 | Rose | 220/46 R |
| 1,369,919 | 3/1921 | Eliel | 220/46 R |
| 1,982,044 | 11/1934 | Clark | 220/46 MS |
| 2,670,398 | 2/1954 | Sheadel et al. | 220/46 R |
| 3,139,210 | 6/1964 | Hein | 220/81 R |

Primary Examiner—M. Henson Wood, Jr.
Assistant Examiner—Edwin D. Grant
Attorney—Francis X. Doyle, Vale P. Myles, Frank L. Neuhauser, Oscar B. Waddell and Joseph B. Forman

[57] ABSTRACT

An hermetic sealing system for openings in an enclosure. In one form a cover is provided having an edge fitting over a container having a lip with the cover fitting loosely over the lip of the container. A flexible gasket member is provided between the lip of the container and the edge of the cover. A metal band is provided encircling the mating portions of the container and the cover compressing the flexible gasket between such mating portions. A mastic such as a room temperature cure epoxy is forced into the space between the metal band and the container, the mastic also filling the space between the edge of the cover and lip of the container and moving into contact with the flexible gasket. The mastic is then cured, firmly sealing the cover to the container. If desired, the metal band may be treated with a release agent and then removed after the mastic is cured. In another form, a bushing member surrounds an opening in a wall and is bolted to the wall. A channel in the base of the bushing carries a flexible gasket member compressed against the wall member about the opening. A second channel in the base of the bushing is filled with a mastic which when cured seals the bushing to the wall member.

10 Claims, 4 Drawing Figures

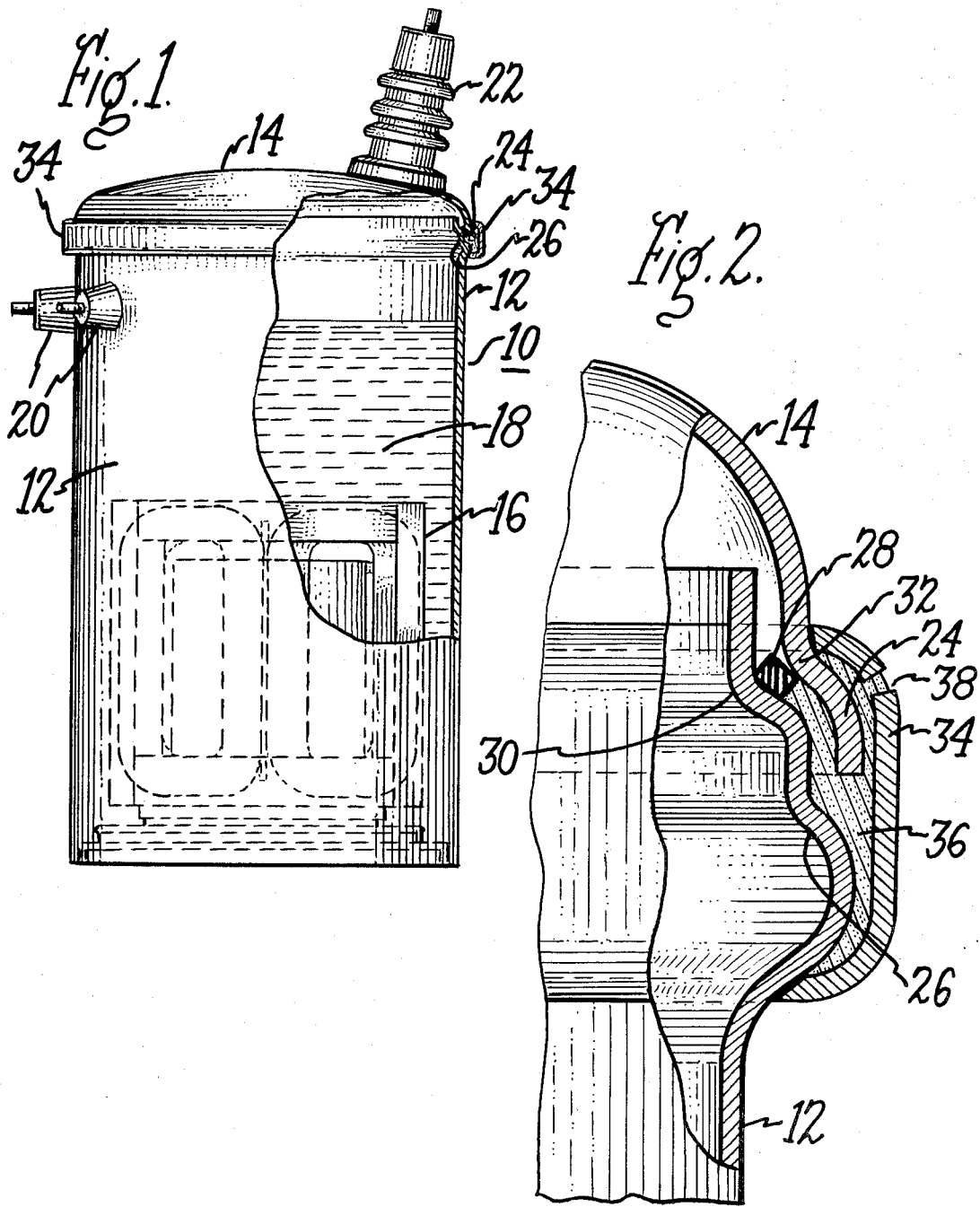

Inventor,
Langdon T. Frey, III,
by Francis K. Doyle
His Attorney.

HERMETIC SEALING SYSTEM

BACKGROUND OF THE INVENTION

This invention relates to hermetic seals and more particularly to an hermetic sealing system for sealing two overlying members.

In many industrial applications, a gas tight joint or an hermetic seal is required between two members. If the members are of metal, many times welding soldering or brazing are utilized. An alternative which is also often used is the provision of a resilient gasket or packing between the members together with an arrangement for holding such members together compressing the gasket or packing therebetween. One example of this type of application is a permanently sealed distribution transformerl . The use of an insulating oil or other dielectric liquid in the transformer casing which as is well known deteriorates when exposed to the atmosphere requires that the casing be hermetically sealed. When this type of transformer is properly constructed, no maintenance is normally necessary for many years. In fact, in many cases before the time for maintenance arrives, the transformer has to be replaced by one of greater capacity so that maintenance in the field is not ordinarily required. For the foregoing reason, it is possible to make what is ge5erally termed a "permanently" sealed transformer.

In the past, welding has often been utilized to provide a permanent seal which has an hermetic feature. However, a welding operation normally increases the cost of the transformers and utilities, although preferring permanently sealed transformers, have still largely purchased gasket sealed transformers since they normally adequately provide an hermetic seal for the transformer and are normally less costly and more easily maintained when maintenance is required. Also, with a welding operation, the weldment normally presents a corrosion problem which must be properly painted or otherwise coated so as to resist such corrosion and often this is a maintenance requirement of the utility when a welded joint is used in transformers. Of course, it will be understood that all entries to the transformer must be hermetically sealed. For example, bushing members are provided for the entry and exit of electrical cable to the transformer. These members must be hermetically sealed to the transformer.

There has been recently developed many types of plastic adhesives which can be utilized to make a suitable hermetic seal. However, many of these adhesives require a protracted curing period before their full strength is reached. This long curing period is normally not compatible with mass production techniques which are used in the manufacture of distribution transformers. Another problem which is found with the use of plastic adhesives is that they do not provide an adequate vapor barrier to prevent moisture from entering into the sealed transformer.

It is, therefore, one object of this invention to provide an hermetic sealing system for electrical apparatus which can be used by mass production techniques.

It is a further object of this invention to provide an hermetic seal suitable for use on electrical distribution apparatus.

A still further object of this invention is to provide an hermetic sealing system which also mechanically secures the overlying surfaces which are sealed.

SUMMARY OF THE INVENTION

Briefly in one form, this invention comprises a container having a lip and a cover having an edge portion which overlies the container lip. A flexible gasket member is placed between the edge of the cover and the lip of the container. A metal band is secured to the overlying surfaces forcing them together and compressing the gasket. A plastic mastic material is forced between the cover band and the overlying surfaces filling all spaces therebetween and contacting the gasket. When cured, the plastic material holds the overlying surfaces together and with the gasket forms an hermetic seal between the overlying surfaces.

In another form a bushing member is mounted on a wall about an opening in the wall. A first channel in the base of the bushing carries a flexible gasket compressed between the bushing and the wall. A second channel is provided and a plastic mastic is forced into the second channel between the bushing and the wall, and when cured seals the bushing to the wall.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of the present preferred embodiment when considered in the light of the accompanying drawings.

BRIEF DESCRIPTION OF THE DRAWINGS

FIG. 1 is a plan view with parts broken away of an electrical distribution apparatus using a preferred form of the sealing system of this invention; and FIG. 2 is an enlarged partial sectional view showing the preferred sealing system of this invention in greater detail;

DESCRIPTION OF PREFERRED EMBODIMENT

Figure 3:
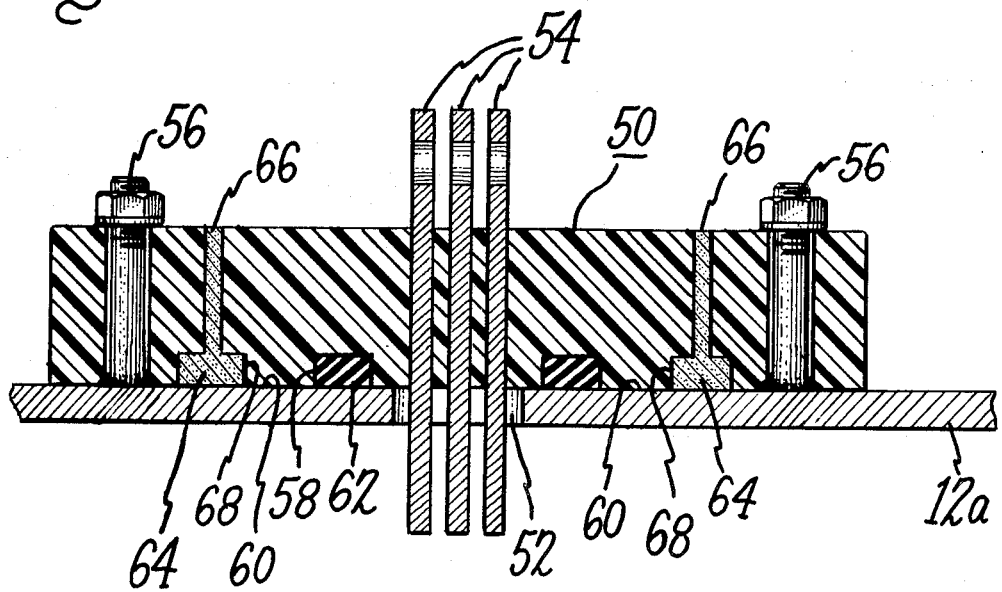
FIG. 3 is a sectional side view of one form of bushing member showing a preferred form of the sealing system of this invention used therewith.

Referring to the drawings in which like numerals are used to indicate like parts and particularly to FIGURE 1, there is shown an electrical distribution apparatus 10, for example, a distribution transformer, having a tank or container 12 and a cover 14. Mounted within tank 12 is a core and coil unit 16 which as shown is submerged in a dielectric fluid 18 which may be, for example, an insulating oil. Tank wall 12 is provided with a plurality of low voltage bushings 20 while cover 14 has a high voltage bushing 22 mounted thereon. As will be understood, it is required to seal the cover 14 to the tank 12 in an hermetic manner so as to prevent moisture or other contaminates from entering the dielectric fluid 18 and possibly causing failure of the electrical apparatus 10. The cover 14 has an edge 24 which overlies the lip 26 on tank 12. This can best be seen from FIGURE 2 of the drawing.

Considering now FIGURE 2, as can be seen, edge 24 is contoured so as to substantially follow the contours of the lip 26, as is shown. A gasket member 28 is placed around lip 26 on a channel or ledge 30 which is formed by the contour of lip 26.

In one embodiment of the invention, the gasket 30 is made of an acrylic rubber material and is bonded to the ledge 30 by means of an epoxy cement. In another embodiment of the invention, the acrylic rubber gasket 28 is vulcanized in place on the lip 26 in the ledge 30 in a manner which will be well understood by those skilled in the art.

As is apparent from FIGURE 2, the edge 24 of cover 14 has a portion 32 which is similar to ledge 30 on the lip 26. As can be seen, portion 32 of edge 24 engages gasket 28 compressing it between ledge 30 and portion 32. Of course, if desired, it will be understood that an epoxy cement could be applied to the gasket 28 so as to adhere to portion 32 of edge 24 as the parts are placed together in the manner shown in FIGURE 2. After the parts are placed in overlying relationship with gasket 28 compressed between ledge 30 and portion 32 of edge 24, a metal band 34 is placed around the overlying surfaces of the lip 26 and edge 24 and tightened in any known manner so as to force the overlying surfaces together and further compress gasket 28 between ledge 30 and portion 32. After cover band 34 has been tightened, a mastic material 36 is forced into band 34 through an opening 38. As will be understood, the mastic 36 fills all of the open spaces between band 34, cover edge 24 and tank lip 26 as well as all of the spaces between edge 24 and lip 26 until the mastic contacts the gasket 28 therebetween in the manner shown in the drawing. In the preferred embodiment, the mastic 36 may be a room temperature vulcanizing silicone rubber material or it may be a room temperature curing epoxy resin. Obviously, other types of plastic material may be used as desired.

If the mastic 36 is an epoxy material, it is possible to coat the inner portion of metal band 34 with a release agent. Then when the epoxy 36 is fully cured, the cover band 34 can be removed and reused for making further hermetic sealing systems. As is well know, the epoxy will provide a strong mechanical bond between cover 14 and tank 12 eliminating the necessity for the metal band 34.

As will be understood, the gasket member 28 prevents any of the dielectric fluid 18 from contacting mastic 36 and as is well known the dielectric fluid may cause damage to the mastic 36 depending on the type of material used. The gasket 28 also prevents any moisture which may penetrate mastic 36 from reaching the oil 18. As will be understood, the acrylic rubber gasket 28 will prevent any moisture from entering the tank even though it should penetrate the mastic 36.

As will be understood, it is necessary that all openings or entrances to transformer 10 be hermetically sealed. For example, low voltage bushings 20 on wall 12 as shown in FIGURE 1, surround an opening (not shown) in wall 12, allowing the low voltage leads to be brought out from the transformer 10. The hermetic sealing system of this invention may also be used to hermetically seal a bushing to a wall member. FIGURE 3 shows one form of bushing member 50 which is mounted on a wall member 12a, such as the wall of a transformer enclosure, surrounding an opening 52 in wall 12a. A plurality of leads 54 are embedded in bushing 50 and extend through opening 52 for connection to internal leads (not shown) in a manner well understood in the art In the form shown in FIGURE 3, a plurality of bolts 56 are provided for bolting bushing 50 to the tank wall 12a. Obviously, other known fastening means could be provided, if desired. A channel 58 is provided in the base 60 of bushing 50, surrounding the opening 52 in the wall 12a. A resilient gasket 62, such as acrylic rubber, is mounted in channel 58, for example, by means of an epoxy cement. When bushing 50 is bolted, or otherwise attached to wall 12a, gasket 62 is compressed between bushing 50 and wall 12a, forming a seal about opening 52. After bushing 50 has been tightened, to compress gasket 62, a plastic mastic material 64 is forced through opening 66 in bushing 50 into a second channel 68 formed in base 60 of the bushing 50. As will be understood, mastic 64 completely fills channel 68 and, on curing, forms a strong bond between bushing 50 and wall 12a. Of course, mastic 64 may be either room temperature vulcanizing silicone rubber or a room temperature curing epoxy resin, as previously discussed with reference to FIGURES 1 and 2. Obviously, other types of plastic material could be used, the requirement being that they cure substantially at room temperature and that they form a strong, hermetic bond between bushing 50 and wall 12a.

As shown in FIGURE 3, it is preferred to have two openings 66 in bushing 50. One opening 66 is used to force the mastic material 64 into channel 68, the other opening shows completion when the mastic 64 appears in the opening. Of course, the same use may be made of two openings 38 in band 36 of FIGURES 1 and 2.

Figure 4:
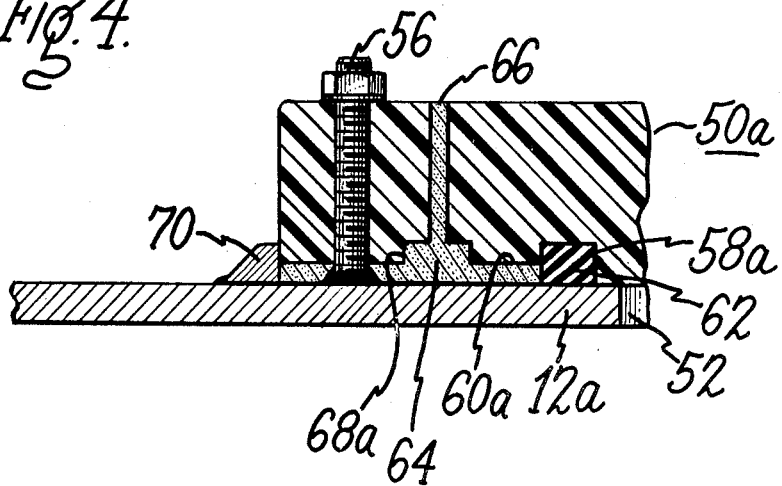
FIG. 4 is a partial sectional view similar to FIGURE 3 showing a modified form of the sealing system of FIGURE 3.

A modification of the hermetic sealing system of FIGURE 3 is shown in FIGURE 4, which is only a partial sectional view. As shown in FIGURE 4, the bushing 50a is bolted to wall 12a about opening 52 by bolts 56. A channel 58a in base 60a of bushing 50a, surrounding opening 52 has a resilient gasket 62 mounted therein and compressed between bushing 50a and wall 12a, as in FIGURE 3. As shown, base 60a of bushing 50a is notched or raised slightly from wall 12a and includes a second channel 68a with an opening 66 from the top of bushing 50a providing access to channel 68a and the notch in the base 60a. A dam 70 is placed about bushing 50a closing the notch in base 60a, as shown. The dam 70 may be plastic or metal, as desired. A mastic material 64 is then forced through opening 66 into channel 68a and the notch in base 60a, completely filling the open space between dam 70 and gasket 62. After mastic 64 has cured, it will form a strong bond between bushing 50a and wall 12 a, as previously discussed with reference to FIGURE 3.

While there has been shown and described the present preferred embodiment of the hermetic seal system of this invention, it will of course be obvious to those skilled in this art that changes or modifications may be made without departing from the invention. It is intended by the attached claims to cover all such changes and modifications as fall within the spirit and scope of the invention.

What is claimed as new and desired to secure by Letters Patent of the United States is:

1. An hermetic sealing system for joining a cover to a container in which said cover and said container have overlying surfaces comprising a flexible gasket member compressed between said overlying surfaces, a metal band member surrounding said overlying surfaces and pressing said overlying surfaces into sealing engagement with said gasket and a room temperature curing plastic material completely filling all the spaces between said metal band and said overlying surfaces and contacting said gasket.

2. An hermetic sealing system for sealing an opening in a container in which a sealing member is provided overlying said opening, said sealing member and said container having overlying surfaces comprising a channel formed in one of said overlying surfaces, a flexible gasket member secured in said channel and compressed between said overlying surfaces, a space provided between said overlying surfaces extending exteriorly of said gasket to the edge of said overlying surfaces, means secured at said edge of said overlying surfaces to close said space therebetween and a room temperature curing plastic material completely filling said space between said overlying surfaces and contacting said gasket and said means secured to said edge of said overlying surfaces.

3. An hermetic sealing system as claimed in claim 2 in which said sealing member is a cover for said container and said means secured at said edge of said overlying surfaces is a metal band surrounding said overlying surfaces and pressing said overlying surfaces and compressing said gasket therebetween.

4. An hermetic sealing system as claimed in claim 2 in which said sealing member is a bushing, said channel is formed in said bushing and said means closing said space between said overlying surfaces is a dam member mounted on said container surrounding and secured to the edge of said bushing.

5. An hermetic sealing system for sealing an opening in a container in which a bushing member is provided overlying said opening with said bushing and said container having overlying surfaces comprising a first channel member formed in said bushing and completely surrounding said opening in said container, a flexible gasket member mounted in said first channel and compressed between said overlying surfaces, a second channel formed in said bushing completely surrounding said first channel, at least one opening extending from the exterior of said bushing to said second channel and a room temperature curing plastic material completely filling said second channel and said opening.

6. A method of making an hermetic seal between a cover and a container comprising,
    a. placing a flexible gasket member on the outer surface of the lip of said container,
    b. placing said cover on said container with a surface of the cover overlying a mating surface of said container,
    c. placing a metal band in overlying relationship completely surrounding said overlying surfaces and tightening said metal band to compress said gasket between said overlying surfaces and
    d. completely filling the spaces between said cover band and said overlying surfaces with a plastic material.

7. The method of making an hermetic seal as set forth in claim 6 in which said flexible gasket is vulcanized in place to the lip of said container.

8. The method of making an hermetic seal as set forth in claim 6 in which said gasket is coated with an epoxy cement, and said epoxy cement hardens to adhere to said overlying surfaces of said container and said cover.

9. A method of making an hermetic seal between a sealing member and a container having an opening therein comprising,
    a. placing a flexible gasket member around said opening between said sealing member and said container,
    b. providing securig means between said sealing member and said container, said securing means drawing said sealing member against said container and compressing said gasket therebetween,
    c. completely filling the space between said sealing member and said container exteriorly of said gasket with a room temperature curing plastic material.

10. A method of making an hermetic seal between a bushing and a container having an opening therein comprising,
    a. providing a pair of channels in the base of said bushing,
    b. mounting a flexible gasket in one of said pair of channels,
    c. securing said bushing to said container with said gasket surrounding said opening and compressed between said bushing and said container,
    d. completely filling said other channel between said bushing and said container with a room temperature curing plastic material.

* * * * *